UNITED STATES PATENT OFFICE.

CYPRIEN MARIE TESSIÉ DU MOTAY, OF PARIS, FRANCE, ASSIGNOR TO EDWARD STERN, OF NEW YORK.

Letters Patent No. 87,477, dated March 2, 1869.

IMPROVEMENT IN PREPARING ZIRCONIA FOR USE IN PRODUCING LIGHT, AND FOR OTHER PURPOSES.

The Schedule referred to in these Letters Patent and making part of the same.

*To whom it may concern:*

Be it known that I, CYPRIEN MARIE TESSIÉ DU MOTAY, of Paris, in the Empire of France, have invented certain new and useful Improvements in the Preparation of Zirconia, and the Employment of the same to Develop the Light of Oxyhydrogen Flame; and I hereby declare the following to be a full, clear, and exact description of the same.

Zirconia, or oxide of zirconium, in whatsoever manner extracted from ores, is capable of being agglomerated, by means of compression, in such manner as to furnish, for instance, pencils, disks, cylinders, &c., adapted to be exposed to the flame of mingled oxygen and hydrogen, without becoming calcined, fused, or otherwise impaired.

Of all the earthy oxides at present known, this is the only one which remains completely unaltered under the action of a blow-pipe fed with oxygen and hydrogen, or mixtures of oxygen with gaseous or liquid carburetted hydrogen; and likewise, of all the earthy oxides, this is the one which, when placed in an oxyhydrogen flame, develops the most intense and steady light.

In order to obtain zirconia, as an article of manufacture, for employment in the industrial arts, I extract it from its ores, by transforming, by the action of chlorine in the presence of charcoal, the silicate of zirconium into the double chloride of zirconium, and of silicium.

The chloride of silicium, more volatile than the chloride of zirconium, is separated from the latter by the action of the heat. The chloride of zirconium which remains, is then brought to the condition of an oxide by any one of the methods now known and employed in chemistry.

The zirconia thus obtained is first calcined, then slightly moistened and pressed in moulds, with or without the aid of agglutinating-agents, such as borax, boracic acid, clay, &c.

The pencils, disks, or cylinders, thus agglomerated, are then carried to a high temperature, and subjected to an annealing-process, so to speak, the effect of which is to augment their density and molecular compactness.

There may also be compressed, in moulds of suitable construction, a small quantity of oxide of zirconium, in the form of a cylinder, of little thickness, which can be united by compression in the same mould with other refractory earths, such as magnesia, clay, &c.

In this manner, I obtain very cheap pencils, of which that part alone which is exposed to the action of the flame is pure zirconia, while the other portion, which serves as a support, is composed of a less costly substance.

The property possessed by zirconia, of being at once the most infusible, the most unalterable, and the most luminous of all chemical bodies known at this time, when it is subjected to the action of oxyhydrogen flame, has been first discovered by me, as well as the property it has of being agglomerated and moulded, either by itself, or when mixed with a small proportion of agglutinating-matter.

What I claim, therefore, and desire to secure by Letters Patent, is—

1. The employment of zirconia to develop and intensify the light of oxyhydrogen flame, substantially in the manner herein set forth.

2. The method of extracting and obtaining zirconia from its ores, substantially in the manner and by the means herein specified.

3. The manufacture of pencils, cylinders, &c., of zirconia, agglomerated and compressed, substantially as and for the purposes herein specified.

4. A compound pencil, or cylinder, or its equivalent, for illuminating-purposes, composed of zirconia and magnesia, clay, or like refractory substance, united substantially as and for the purposes herein set forth.

In testimony whereof, I have signed my name to this specification, before two subscribing witnesses.

C. M. TESSIÉ DU MOTAY.

Witnesses:
J. ARMENGAUD,
DAVID T. G. FULLER.